United States Patent

Madison

[11] Patent Number: 5,868,078
[45] Date of Patent: Feb. 9, 1999

[54] ROAD AND RAIL VEHICLE USING RAIL WHEEL DRIVE AND APPARATUS

[75] Inventor: Harry Madison, Memphis, Tenn.

[73] Assignee: Harsco Technologies Corporation, Fairmont, Minn.

[21] Appl. No.: 820,897

[22] Filed: Mar. 19, 1997

Related U.S. Application Data

[63] Continuation-in-part of Ser. No. 505,025, Jul. 21, 1995, Pat. No. 5,619,931.

[51] Int. Cl.[6] .................................................. B61D 15/00
[52] U.S. Cl. ............................................................ 105/72.2
[58] Field of Search ............................... 105/72.2, 215.1, 105/215.2, 453

[56] References Cited

U.S. PATENT DOCUMENTS

| | | |
|---|---|---|
| 1,827,898 | 10/1931 | Moore . |
| 2,157,651 | 5/1939 | Fildes . |
| 2,896,553 | 7/1959 | Whisler . |
| 3,019,742 | 2/1962 | Kershaw . |
| 3,134,343 | 5/1964 | Matsumura ............................. 105/72.2 |
| 3,179,066 | 4/1965 | Koshobu ................................ 105/72.2 |
| 3,198,138 | 8/1965 | Melcher ................................. 105/72.2 |
| 3,877,390 | 4/1975 | Wallace . |
| 4,497,257 | 2/1985 | White . |
| 4,537,137 | 8/1985 | White . |
| 4,917,020 | 4/1990 | Wicks et al. ........................... 105/72.2 |
| 5,016,544 | 5/1991 | Woollam . |
| 5,103,740 | 4/1992 | Masse . |
| 5,186,109 | 2/1993 | Madison . |
| 5,642,673 | 7/1997 | Lucky .................................... 105/72.2 |
| 5,660,115 | 8/1997 | Shimon et al. ........................ 105/72.2 |

*Primary Examiner*—Mark Tuan Le
*Attorney, Agent, or Firm*—Eckert Seamans Cherin & Mellott

[57] ABSTRACT

A road and rail vehicle has a truck tractor vehicle frame such that it is street legal, but also provides sufficient power to move freight cars on low density rail lines or at other desired locations. The vehicle has a transfer case to provide front wheel drive by road wheels when the vehicle is in a road or highway mode and to provide rear wheel drive by rail wheels when in a rail mode. The vehicle has a front guide rail wheel unit which moves front rail wheels between an upper road position and a lower rail position. A rear or back axle has right and left back road wheels thereon and is movable between an upper rail position and a lower road position.

9 Claims, 10 Drawing Sheets

ROAD AND RAIL VEHICLE USING RAIL WHEEL DRIVE AND APPARATUS

This is a continuation-in-part of application Ser. No. 08/505,025, filed Jul. 21, 1995 now U.S. Pat. No. 5,619,931.

BACKGROUND OF THE INVENTION

The present invention relates to a rail engagement apparatus having powered rail engagement wheels for a road vehicle. Further, this invention relates to a vehicle having such an apparatus mounted to it.

As used herein, a road vehicle is a vehicle having wheels which contact a highway or other road, as opposed to only having wheels which roll on rails on a railroad track.

Railroad service crews often have to go to various places along a railroad track in order to make repairs and inspections. Depending upon the type of service which is performed and other factors, the service crew may ride to the work site using a rail vehicle or using a road vehicle, such as a truck or car. Since the best way to a work site may include travel along a road and travel along a railway, service crews and other rail workers often have used road vehicle having a rail engagement or guide wheel apparatus mounted on them. Such cars or trucks may travel along a highway or other road with road wheels engaging the road. Upon getting to an appropriate place along the railway, the rail engagement apparatus is operated such that railway wheels are lowered from the vehicle until the vehicle is bound to the railway. Usually such vehicles include an apparatus at the front of the vehicle which lifts the front road wheels off the ground when two front railway wheels engage rails and an apparatus at the back of the vehicle, which apparatus secures the back of the vehicle to the rails by two back railway wheels. The two back railway wheels allow the regular road wheels to contact the rails or other surface such that the road wheels may provide traction to move the vehicle even when the two front railway wheels and two back railway wheels have secured the vehicle to the rail. When the vehicle wishes to leave the railway, the two front railway wheels and the two rear railway wheels are retracted or lifted up such that the vehicle may again run along the road.

Various structures have been used to allow railway wheels to be attached to road vehicles. Although such structures have been generally useful at moving the railway wheels between an upper position in which the vehicle may travel along a highway or other road and a lower position in which the vehicle travels along a railway, such structures have often been subject to one or more of several disadvantages.

It has been desirable to have a road vehicle which can also move loads along a railroad track. Various vehicles having rubber tires for highways and rail guide wheels for rails have been used to move railway freight cars with varying degrees of success. Such road/rail vehicles may advantageously move along highways until they reach a railroad track where they can lower their rail engagement wheels and travel along the railroad track. They may then move loads such as rail bound vehicles secured to a rail/highway vehicle. Such rail/highway vehicles may work satisfactorily for some purposes, but the rubber road tires wear out and rapidly fail at higher loads. That is, such rail/highway vehicles are powered by the rubber road tires even though they are bound to the rails when their rail engagement wheels are down. When the loads on the rubber road tires are too high, the tires simply wear out rapidly.

Special vehicles for moving freight cars have been developed, but they are limited to very slow road speeds. These vehicles are basically small locomotives having rail engagement wheels which do not raise and lower. Instead, such small locomotives are modified to have rubber tires which raise and lower such that the vehicle can travel on road surfaces off of rails. However, the special tire mounting and drive arrangements for the rubber tires greatly restrict the road speed of such vehicles. Such vehicles travel on road surfaces by using frictional contact between driven rail engagement wheels and road wheels which have been lowered to a road position. In other words, such special vehicles can travel independent of the rails from one side of a rail yard to another side, but cannot be used on a regular road without going so slowly as to substantially impede the flow of other traffic. More importantly, such vehicles do not use road vehicle frames (meaning frames of cars, trucks, or other street legal vehicles). Instead, they use locomotive or other rail vehicle frames and are accordingly not street legal for normal transit on a highway or other road.

Regular locomotives have often been used for moving freight or other rail cars along light traffic density outlying rail lines. For example, if a given manufacturer is sending two freight cars a day to a rail yard on further travel, a locomotive could be used to move the two freight cars. (Alternately, the locomotive would pick up freight cars at the manufacturer only after a larger number of freight cars are ready, but this may slow the manufacturer's ability to ship in timely fashion.) If the locomotive is tied up moving a small number of freight cars, it cannot be used at other locations where its great power is needed. Further, moving the locomotive by rail to the rail line adjacent the manufacturer's plant requires that track occupancy and rail signaling be handled properly so that the locomotive is switched to the right path and does not collide with (or cause significant delays for) other trains using some of the same tracks.

The present inventor's prior U.S. Pat. Nos. 5,154,124, issued Oct. 13, 1992, and 5,186,109, issued Feb. 16, 1993, both assigned to the assignee of the present application, relate to different apparatus for moving a highway vehicle along a railroad track. Both of those patents are hereby incorporated by reference.

OBJECTS AND SUMMARY OF THE INVENTION

Accordingly, it is a primary object of the present invention to provide a new and improved apparatus for allowing a highway vehicle to move along a railroad track.

A further object of the present invention is to provide a new and improved vehicle which can move along highways and along railroad tracks.

A further object of the present invention is to provide an apparatus and a vehicle for rail/highway use which will work satisfactorily with heavy loads such as freight cars.

Yet another object of the present invention is to provide a vehicle, an apparatus, and a method for moving rail cars on light traffic density outlying rail lines.

A further object of the present invention is to provide a vehicle and apparatus for road/rail use which avoids damaging rubber tires when traveling on rails.

Yet another object of the present invention is to provide a vehicle and apparatus for road/rail use which can move relatively quickly on both roads and rails.

The above and other features of the present invention are realized by a road and rail vehicle including a vehicle frame having a front end, a rear end, a right side, and a left side. A first axle having a right road wheel and a left road wheel operably mounted thereon in spaced-apart relation to one another, is mounted on the vehicle frame adjacent to the front end. A second axle having a right road wheel and a left road wheel operably mounted thereon in spaced-apart relation to one another is mounted on the vehicle frame rearwardly of the first axle. A third axle having a right road wheel and a left road wheel operably mounted thereon in spaced-apart relation to one another is pivotally mounted to the rear end of the vehicle frame so as to be pivotally movable into and out of engagement with a road surface. A first rail wheel assembly is provided that includes at least a right rail wheel and at least a left rail wheel operably disposed in spaced-apart relation to one another on a rail axle. The first rail wheel assembly is positioned adjacent to the front end of the vehicle frame and is movable into and out of engagement with the rails of a railroad track. A rail drive assembly is provided that includes at least a right rail-drive wheel and at least a left rail-drive wheel that are operably mounted to an axle on a carriage. The carriage is movably mounted to the rail side of the vehicle frame, between the second and the third axles. Advantageously, the rail drive assembly is movable relative to the frame so as to move the rail-drive wheels into and out of engagement with the rails of the railroad track. Drive means for propelling the vehicle are provided along with a mode controller. The mode controller is operable to select between (i) a road mode in which the road wheels engage a road wherein the vehicle is propelled by driving the road wheels independent of the rail wheels and (ii) a rail mode wherein the first rail wheel assembly and the rail-drive wheels engage the rails of the railroad track. In the rail mode, the vehicle is propelled by driving the rail-drive wheels with all of the road wheels offset from engagement with any surface.

BRIEF DESCRIPTION OF THE DRAWING

These and other objects, features and advantages of the present invention will be more fully disclosed in, or rendered obvious by, the following detailed description of the preferred embodiment of the invention which is to be considered together with the accompanying drawings wherein like numbers refer to like parts and further wherein.

DETAILED DESCRIPTION OF THE PREFERRED EMBODIMENT

Figure 1:
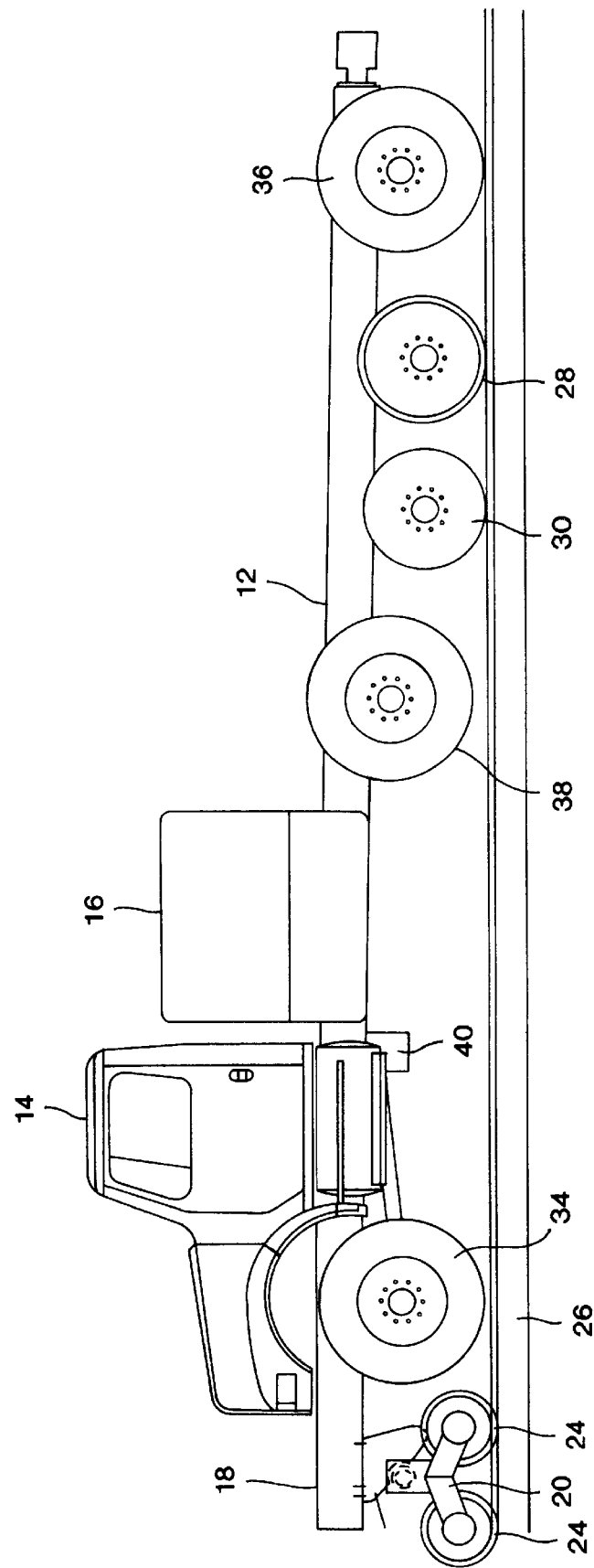
FIG. 1 is a side view of the present invention in a rail mode for traveling along railroad tracks.

Turning initially to FIG. 1, a preferred embodiment of the present invention is a road and rail vehicle 10 having a truck tractor vehicle frame 12 with a cab 14 thereon. A box 16 may house various air equipment used in known fashion for controlling vertically movable axles, air brakes, etc.

A frame extension 18 has been mounted at the front of vehicle 10 for holding a rail wheel guide unit 20 on mount plate 22. The various wheels and other components discussed herein are symmetric with respect to right and left sides of the vehicle such that the construction of the right side components will be understood from the illustrations and discussions of left side components herein.

The rail guide unit 20 has first and second front left rail engagement wheels 24 which are flanged steel wheels for non-powered engagement with left rail 26 (i.e., wheels 24 are not driven when the vehicle is in the illustrated rail mode with the rail wheels 24 in a lower, rail position. The frame extension 18 and rail guide unit 20 may be of a known types used for various previous road vehicles modified to run on rails. However, unlike various of the common road vehicles modified to run on rails which use road tires for propulsion even in the rail mode, the vehicle 20 is propelled in the rail mode by driving rail engagement wheels.

Driving rail engagement wheels (i.e., rail engagement wheels which are driven or powered to propel the vehicle) on the vehicle 10 include left back steel flanged rail engagement wheel 28 and left middle (i.e., middle meaning between the back rail wheel 28 and front rail wheels 24, not necessarily centered) steel non-flanged wheel 30. Each of the rail wheels 28 and 30 (including the pair on the non-illustrated right side of the vehicle) engages a rail for propelling the vehicle along when in the rail mode. The left middle rail wheel 30 and similar right wheel are non-flanged such that they do not cause problems when the vehicle 10 goes around a curve. Although the middle rail wheel 30 is illustrated somewhat offset in the rail direction from back rail wheel 28, the middle wheel 30 might alternately be just in front of wheel 28.

Figure 2:
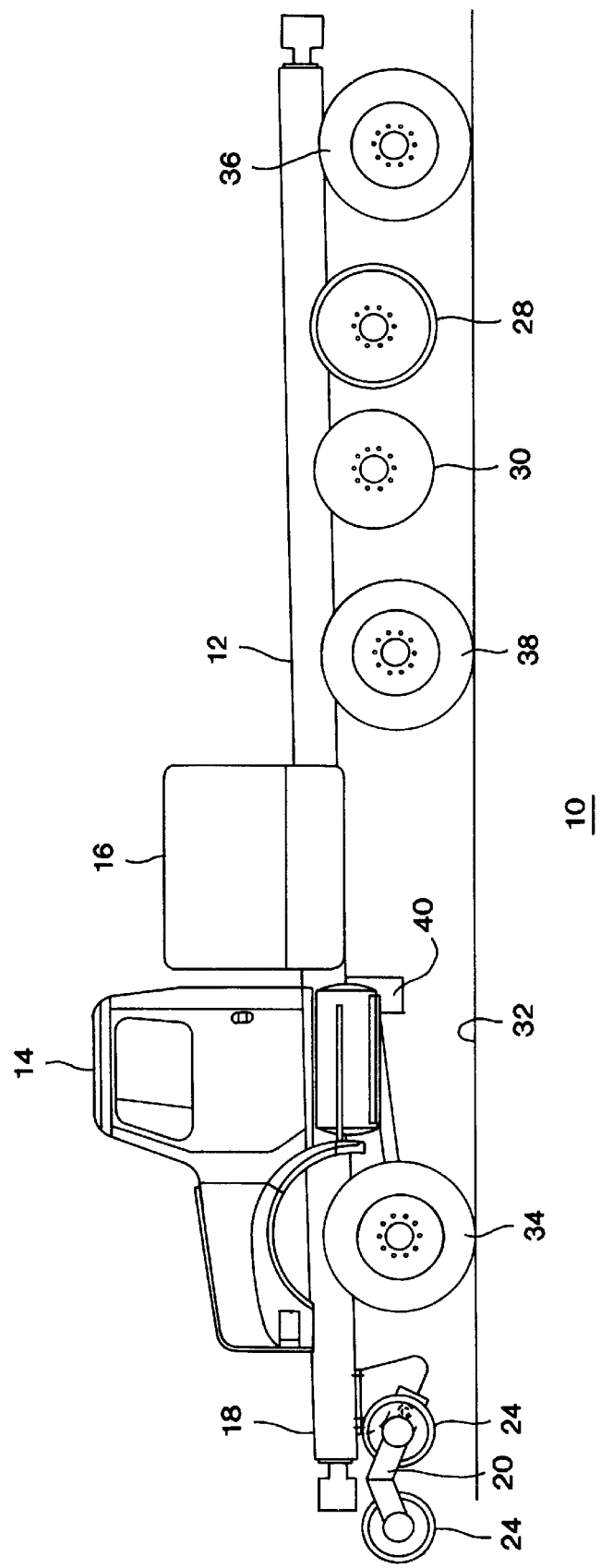
FIG. 2 is a side view of the present invention in a road mode (could also be called highway mode) for traveling along a road.

Continuing to view FIG. 1, but also considering the view of FIG. 2 where the rail wheels 24 are in an upper, road position and the rail wheels 28 and 30 are in a road position (i.e., they are offset vertically from the road surface 32), it will be appreciated that vehicle 10 may travel on highways or other roads surface such as surface 32. A front road wheel 34 is in a road position in which it contacts surface 32 in FIG. 2, whereas road wheel 34 is in a rail position (i.e., vertically offset from and not contacting any surfaces therebelow) in FIG. 1. Note that, in the preferred embodiment illustrated, the road wheel 34 (as well as a similar wheel on the right side of the vehicle) is not moved up or down relative to frame 12 to change from its rail position to its road position. Instead, it is in a road position when the tire of wheel 34 contacts a surface such as 34 below it due to the lifting of rail wheels 24 relative to frame 12. In similar fashion, wheel 34 is in a rail position offset from below surfaces when the rail wheels 24 have been lowered to their rail position of FIG. 1.

When in their road positions of FIG. 2, the rail wheels 28 and 30 have not been moved relative to the frame 12 from their rail positions of FIG. 1. Instead, the change in the positions of wheels 28 and 30 is relative to surfaces such as 32 which are below the vehicle, this change being accomplished by lowering back and middle road wheels 36 and 38 from rail positions (FIG. 1) to road positions (FIG. 2) relative to frame 12. In FIG. 1, the road wheels 36 and 38 are lifted relative to the surfaces below vehicle 10 until the rail wheels 28 and 30 engage rail 26. Note that in FIG. 1, the wheels 36 and 38 (more specifically the tires of these wheels) are not in contact with the surfaces therebelow, but are elevated from any such surfaces.

Accordingly, the preferred embodiment vehicle 10 of the present invention provides vertical movement of front rail wheels 24, middle road wheels 38, and back road wheels 36 for changing from a rail mode (FIG. 1) for traveling along rails to a road mode (FIG. 2) for traveling on roads. (Wheels 28, 30, and 34 are vertically stationary, meaning not vertically movable relative to frame 12, in the preferred embodiment.) In the rail mode, wheels 24, 28, and 30 are in rail positions contacting below surfaces (i.e., rails) and wheels 34, 36, and 38 are in rail positions elevated from any below surfaces. In the road mode, wheels 24, 28, and 30 are in road positions elevated from any below surfaces and wheels 34, 36, and 38 are in road positions contacting surfaces therebelow.

The vertical movement of wheels 36 and 38 may be accomplished using known tag axles (not shown) which use air to raise and lower the axles on which wheels 36 and 38 are mounted. Alternately, tag axles of known design using springs to raise the axles and air to lower the axles may be used.

The propulsion arrangement of vehicle 10 will be discussed with reference to FIG. 3 and continuing to consider FIGS. 1 and 2. A known type of transfer case 40 with gear train therein is used to select which wheels are driving wheels (i.e., used for propulsion) in a given mode. Specifically, transfer case 40 supplies traction power from engine 42 via normal truck transmission 44 to front road wheels 34 when in the road mode of FIG. 2. However, when rail mode is selected on a selector 46 (which together with transfer case 40 may be considered as a mode controller), the transfer case 40 no longer supplies power to front road wheels 34. Instead, the transfer case 40 now supplies power to a secondary transmission 48. The secondary transmission 48, which is not powered when the selector 46 is in a road mode, is preferably a reversing transmission with a control 50 operable in known fashion to switch from forward, reverse, and neutral positions. Therefore, the maximum reverse and forward speeds via transmission 48 will be the same. In the rail mode, transmission 48 powers the back rail wheels 28 and middle rail wheels 30 by way of tandem truck axles 52 (one middle rail axle and one back rail axle). The axles 52 are called rail axles in that they have rail wheels 28 and 30 thereon, but they may be of known design for tandem truck axles such as double reduction thru-drive tandem axles. One can alternately modify such known truck tandem axles slightly by narrowing the tread width to correspond to rail wheels 28 and 30.

Figure 3:
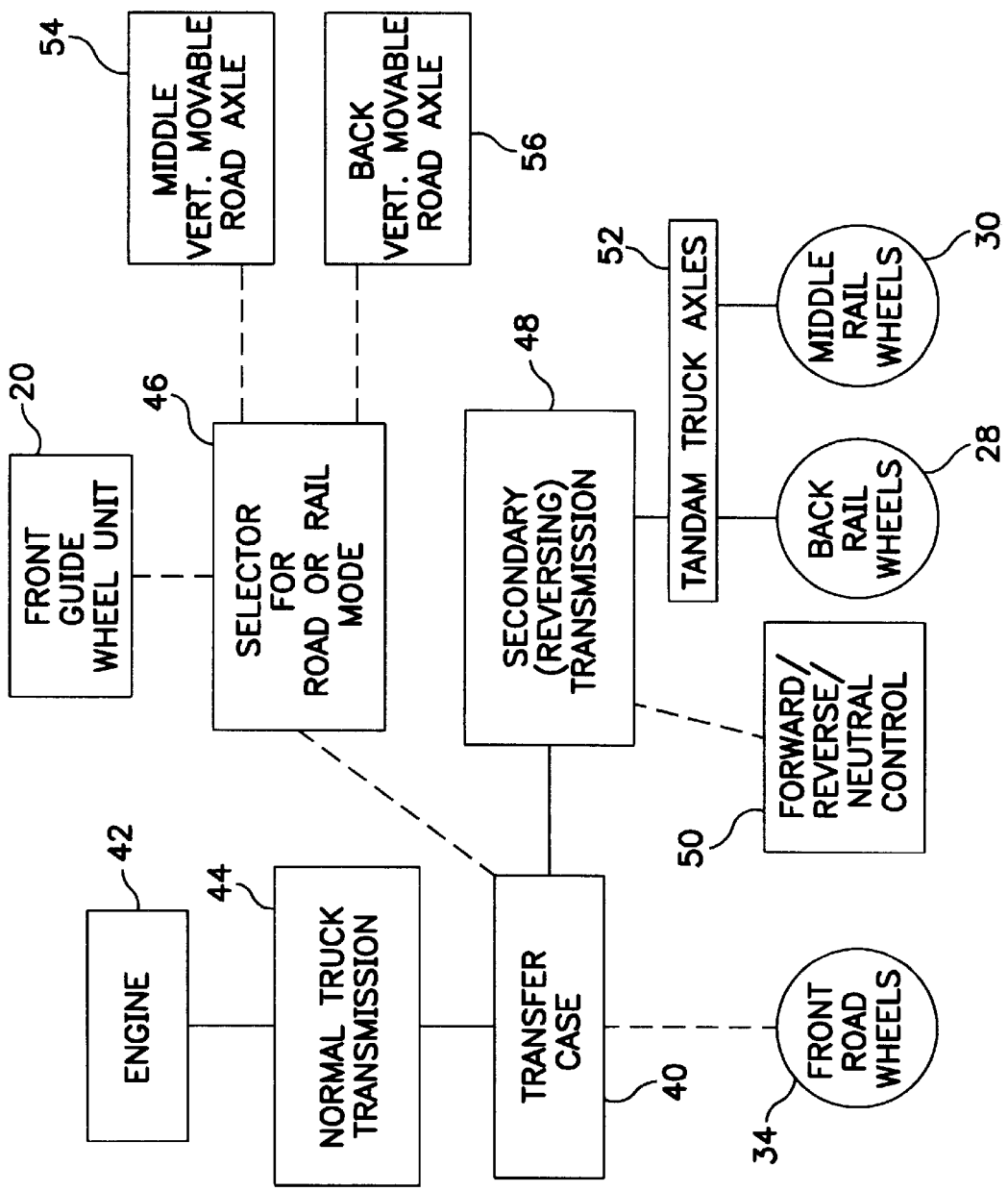
FIG. 3 is a simplified block diagram showing various components of the invention.

Significantly, and as will be apparent from FIG. 3, the road wheels 34 propel the vehicle in the road mode independent of all of the rail wheels. That is, and unlike some prior designs, power to road driving wheels 34 is not supplied via any of the rail wheels. This allows vehicle 10 to travel at reasonable highway speeds and not be limited to the low speeds associated with vehicles where road wheels are driven via rail wheels.

The selector 46 may be of known type of control for a transfer case and may advantageously and in straightforward fashion incorporate controls for raising and lowering the front guide wheel unit 20 corresponding respectively to road mode and rail mode. Further, selector 46 may incorporate controls for raising and lowering a middle road axle 54 and a back road axle 56 corresponding respectively to rail mode and road mode. Such air, air/spring, hydraulic, or other known lifting/lowering mechanisms may also be used for the actual lifting and lowering of rail guide wheel unit 20. Thus, although not shown in FIG. 3 for ease of illustration, a lift/lower mechanism is operably connected between selector 46 and each of components 20, 54, and 56.

Advantageously, the driving wheels (driving rail wheels 28 and 30 and driving road wheels 34) are not moved relative to frame 12, whereas the other wheels (which are non-powered) are moved up and down relative to frame 12. Also, use of rear wheel drive in rail mode, via rail wheels 28 and 30, allows for better loading when rail car coupler 58 has a load of one or more freight or other rail cars coupled to it for pulling by vehicle 10. (The rail car coupler 58 may be powered vertically in order to transfer the load from the rail cars to the vehicle 10 as this will help obtain sufficient tractive effort for pulling/pushing heavy loads on a railroad tracks.) Use of front wheel drive in the road mode minimizes or avoids difficulties and complexities one might otherwise encounter if trying to power the vehicle from the same end (front or back) in both road mode and rail mode.

Note that the wheels 36 and 38 may have two wheels 36 and two wheels 38 (not visible in FIGS. 2 and 3) on each side of the vehicle 10 in known fashion.

In an alternative embodiment of the present invention, illustrated in FIGS. 4–10, a road rail vehicle 100 may also comprise a vehicle frame 110, a propulsion system 115, a drive/steer axle 120, a flip-up tag axle 125, a front rail engagement assembly 130, and a rail drive assembly 135.

More particularly, road and rail vehicle 100 comprises a truck tractor vehicle frame 140 having an operator's cab 145. A frame extension 150 is mounted at the front end of vehicle frame 110 for supporting front rail engagement assembly 130, as will hereinafter be disclosed in further detail. A shelf coupler or draw bar 153 of a type that is well known in the art is mounted at the rear end of vehicle frame 110 (FIGS. 4, 5, and 6) for coupling road rail vehicle 100 to other vehicles. Shelf coupler 153 acts to transfer downward pressure to rail drive assembly 135, when vehicle 100 is in the rail mode and is coupled to a rail vehicle, as will hereinafter be disclosed in further detail.

Propulsion system 115 is similar to that discussed in connection with vehicle 10 in that it is mounted on vehicle frame 110, and comprises one of the well known types of engine that are adapted to propel a wheeled vehicle along either a road or a railroad track. As with vehicle 10, power from the engine is transmitted, via a conventional transmission 160, to a modified reversing transmission 170, via drive shaft 172. More particularly, reversing transmission 170 is modified so as to be capable of driving output shafts 175 and 190 (FIGS. 4 and 5) in either of two directions, i.e., either clockwise or counterclockwise. Two conventional declutches 180A and 180B are operatively mounted to each end of modified reversing transmission 170 so as to engage selectively with, and transfer motive force to, drive/steer axle 120 and/or rail drive assembly 135. Advantageously, modified reversing transmission 170 allows drive/steer axle 120 to be driven in the same direction as rail drive assembly 135 when vehicle 100 is moving in either the forward or reverse direction.

Alternatively, power from the engine may be transmitted, via a conventional transmission, to a conventional transfer case and then to a modified reversing transmission 170. In this embodiment of the invention, modified reversing transmission 170 is equipped with a neutral position. During road use, i.e., when drive/steer axle 120 is driven by means of its engagement with the conventional transfer case, the modified reversing transmission is placed in a neutral position. When in rail mode, the conventional transfer case declutch (that engages drive/steer axle 120) is disengaged, and modified reversing transmission 170 is engaged so as to allow movement of road rail vehicle 100 in either a forward or backward direction along the railroad track.

Figure 4:
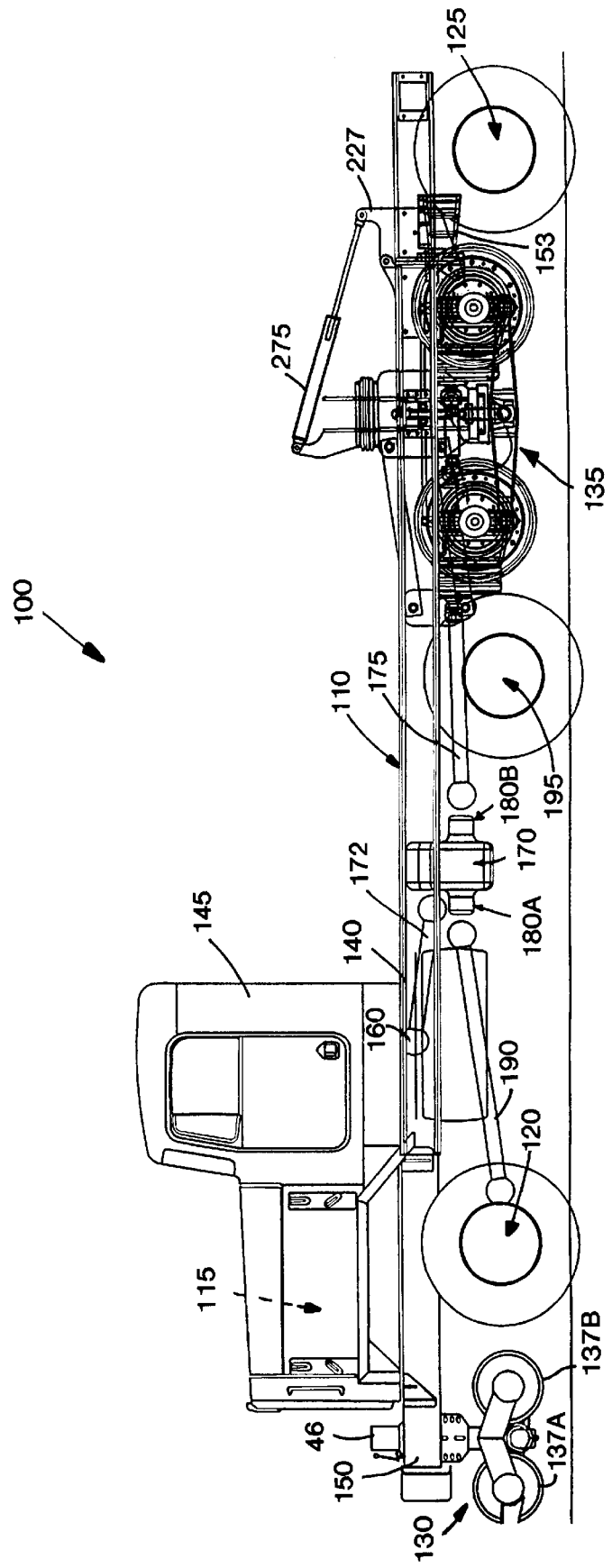
FIG. 4 is a side view of an alternative embodiment of the present invention in a road or highway mode for traveling along a road.
Figure 5:
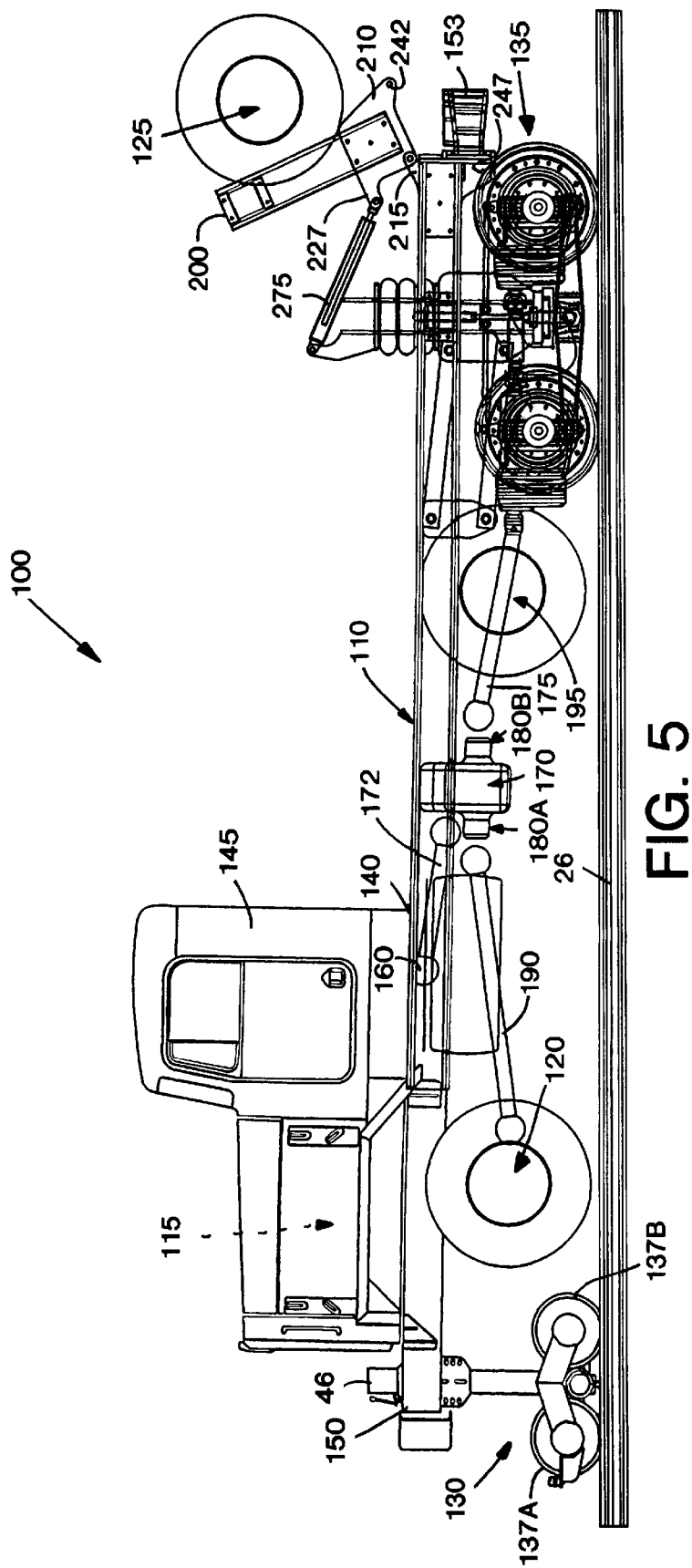
FIG. 5 is a side view of the embodiment shown in FIG. 4, but in a rail mode for traveling along railroad tracks.

Still referring to FIGS. 4 and 5, rail guide assembly 130 is substantially similar to rail guide unit 20 in that it has first and second front rail engagement wheels 137A and 137B which are flanged steel wheels for non-powered engagement with rails 26. In particular, wheels 137A and 137B are not driven when vehicle 100 is in the rail mode shown in FIG. 5. Both frame extension 150 and rail guide assembly 130 may be of a known type that is often used in connection with various conventional road vehicles modified to run on rails. However, unlike conventional road vehicles that are modified to run on rails and which use road tires for propulsion even in the rail mode, vehicle 100 is propelled in the rail mode by driving a plurality of rail engagement wheels disposed on rail drive assembly 135, as will hereinafter be disclosed in further detail.

Drive/steer axle 120 is positioned on vehicle frame 110 so as to be disposed rearwardly of front rail guide assembly 130. Drive/steer axle 120 is operably connected to modified reversing transmission 170, via front drive shaft 190, and includes right and left road wheels of the type that are well known for use on conventional road surfaces. Drive/steer axle 120 is of conventional construction.

Support axle 195 is positioned rearwardly of drive/steer axle 120 and adjacent to rail drive assembly 135 on vehicle frame 110. Support axle 195 also includes right and left road wheels. The positioning of support axle 195 rearwardly of drive/steer axle 120 and adjacent to rail drive assembly 135 provides structural support for rail drive assembly 135 on vehicle frame 110 when rail drive assembly 135 is not engaging rails 26, i.e., during road mode operation of vehicle 100.

Figure 6:
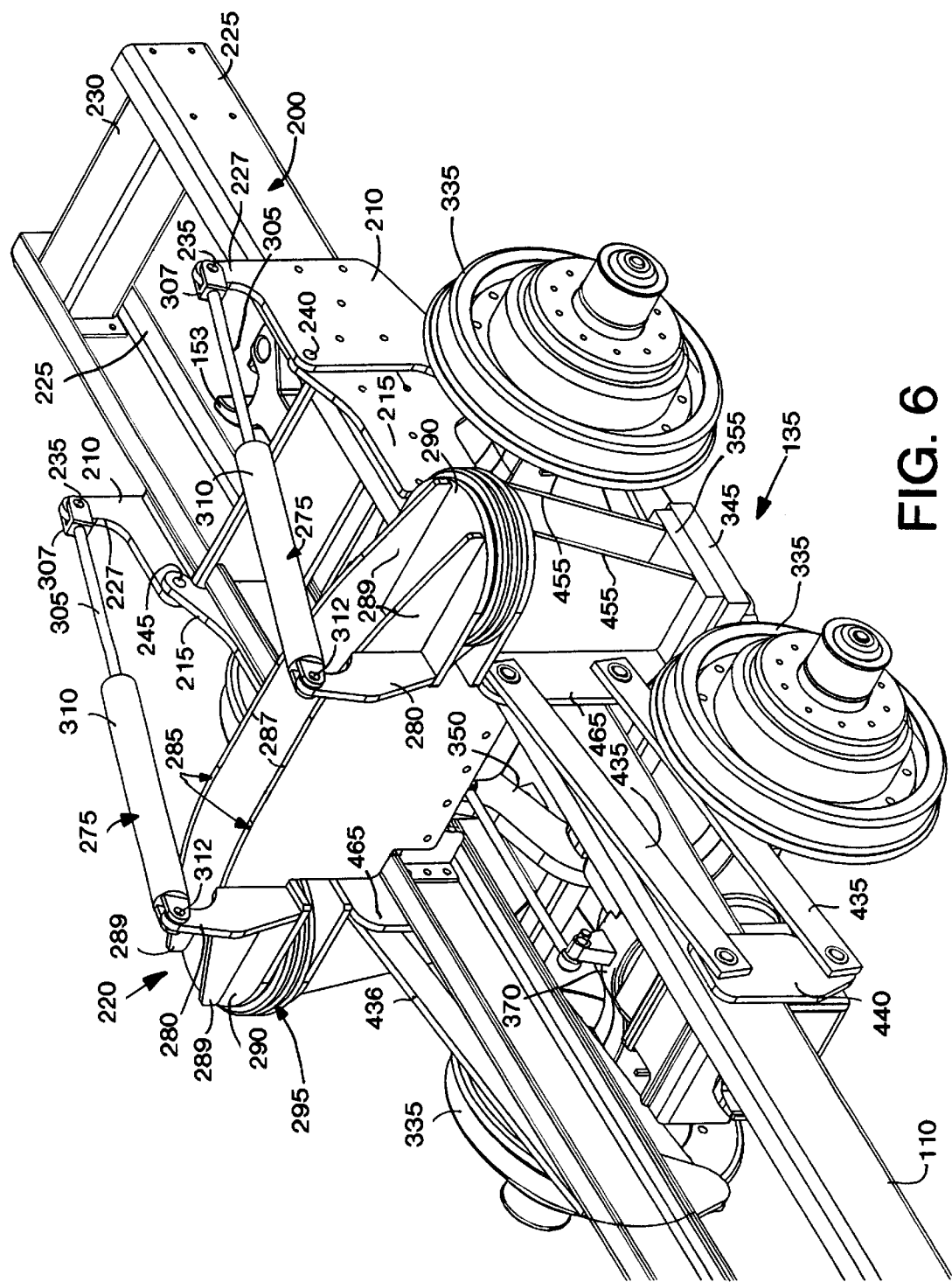
FIG. 6 is a perspective view of the rail drive assembly, including a portion of the flip-up tag axle.

Referring now to FIGS. 4–6, flip-up tag axle 125 comprises a frame 200, two lever-brackets 210, two pivot-brackets 215, and a lift assembly 220. More particularly, frame 200 comprises at least a pair of spaced-apart structural members 225 that are joined at their distal end by a crossbeam 230. A lever-bracket 210 is fastened to the outer surface of the proximal end of each structural member 225. Each lever-bracket 210 is formed from a planer plate of metal or the like, and comprises a cylinder-pivot hole 235, a frame-pivot hole 240, and a lock-hole 242, that are each defined in spaced-relation to one another through its thickness. A corner portion of each lever-bracket projects upwardly relative to the proximal end of each structural member 225 thereby providing a lever arm 227. Advantageously, a cylinder-pivot hole 235 is defined in an upper portion of each lever arm 227.

Each pivot-bracket 215 is also formed from a planer plate of metal or the like, and comprises a pivot hole 245 and a lock-hole 247 that are defined through its thickness at opposing outer corners thereof. Pivot-brackets 215 are fastened to the right and left outer surfaces of the rear end of vehicle frame 110 adjacent to the proximal end of frame 200. When fully assembled to vehicle frame 110, lever-bracket 210 is pivotally mounted to pivot-bracket 215, via a pivot pin inserted through pivot-holes 240 and 245, so that lever-bracket 210 is positioned in overlying confronting realtion to pivot-bracket 215 (best illustrated in FIG. 6).

Lift assembly 220 is mounted on vehicle frame 110, above rail drive assembly 135, and comprises actuation cylinders 275, cylinder-brackets 280, support members 285, pressure plates 290 and air bags 295.

More particularly, actuation cylinders 275 may comprise either hydraulic or pneumatic cylinders of a type that are well known in the art. Actuation cylinders 275 each comprise a piston rod 305 and a cylinder housing 310. The free end of each piston rod 305 includes a yoke coupling 307 that is adapted to pivotally couple the free end of piston rod 305 to cylinder-pivot hole 235 of lever-bracket 210, via insertion of a conventional pivot pin therethrough. The free end of each cylinder housing 310 includes a yoke coupling 309 having a pivot-hole 312 defined therein that is adapted to pivotally couple the free end of cylinder housing 310 to an upper portion of cylinder-bracket 280, via the insertion of a conventional pivot pin therethrough.

Cylinder-brackets 280 comprise planer plates of metal or the like that are oriented vertically relative to frame 110, and are fastened along one edge to support member 285 and along another edge to pressure plate 290. At an upper end of each cylinder-bracket 280 is defined a pivot-hole that is adapted to receive a conventional pivot pin. Cylinder-bracket 280 has a thickness selected so as to be pivotally received within yoke coupling 309 of cylinder housing 310 so as to position the pivot holes in cylinder-brackets 280 in coaxial alignment with pivot-hole 312.

Support members 285 comprise substantially T-shaped structural support elements that include a central trunk portion 287 and a pair of laterally disposed wing portions 289, as best illustrated in FIG. 6. Central trunk portion 287 is adapted to be mounted transversely on vehicle frame 110 so as to stand on end in substantially perpendicular relation to the longitudinal axis of vehicle 100. In this arrangement, wing portions 289 project outwardly from the top right and left sides, respectively, of central trunk portion 287 and outwardly from both the right and left sides of vehicle frame 110.

A pressure plate 290 is fastened to the lower edge of each wing portion 289 so as to provide a broad surface adapted to rest on and be engaged by, a corresponding upper surface portion of a corresponding airbag 295. Right and left airbags 295 are mounted on lift assembly 220 and are of conventional construction. The vertical movement of rail drive assembly 135 is accomplished, in part, by pumping air into, or releasing air from, airbags 295.

Referring now to FIGS. 7–10, rail drive assembly 135 includes a first axle 325, a second axle 330, rail wheels 335, two walking beams 340, a lower pivot-plate 345, a torque reaction plate 350, an upper pivot-plate 355, two four-bar linkage assemblies 360, and a lift assembly support structure 365. More particularly, first axle 325 and second axle 330 are positioned in transverse relation to vehicle frame 110 so as to be disposed in spaced-apart, parallel relation to one another. Axles 325,330 are of conventional construction.

Four rail wheels 335 are disposed, one each, on the outer ends of each axle 325,330 in the manner well known in the art. Each axle 325,330 includes a conventional axle housing 370 that is adapted to transfer rotational motive force to rail wheels 335, via a conventional gear system disposed within axle housing 370 as is well known in the art.

Drive shaft 175 is operatively coupled to axle housing 370 of first axle 325 by a conventional yoke and spline shaft slip joint 327. Drive shaft 175 transfers rotational motive force to rail drive assembly 135 from modified reversing transmission 170. A coupling shaft 375 is operatively mounted between the axle housings 370 of first and second axles 325, 330 so as to transfer rotational motive force to second axle 330.

Figure 7:
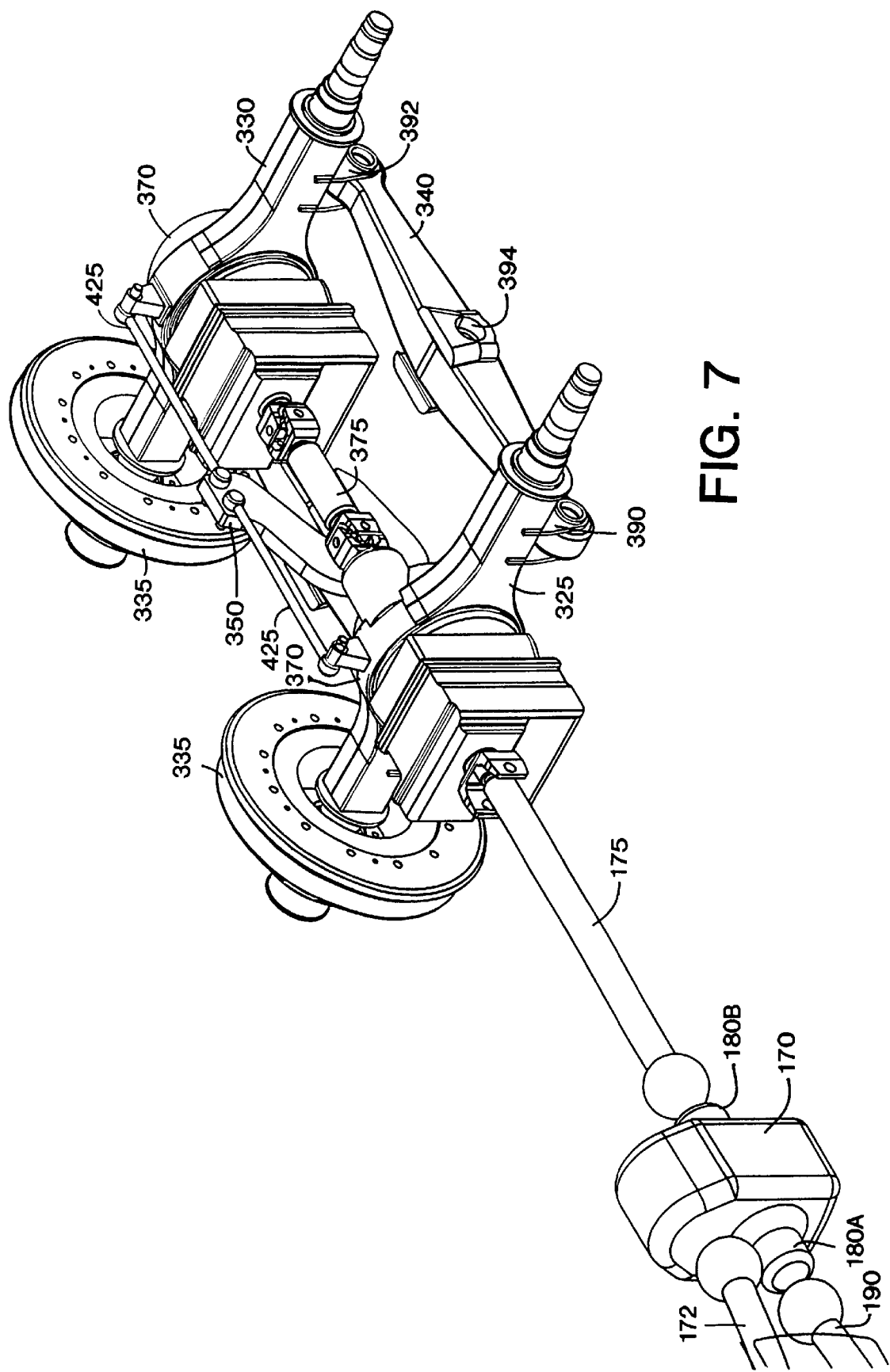
FIGS. 7–10 are perspective views of the rail drive assembly with portions of the flip-up tag axle removed for clarity of illustration.
Figure 8:
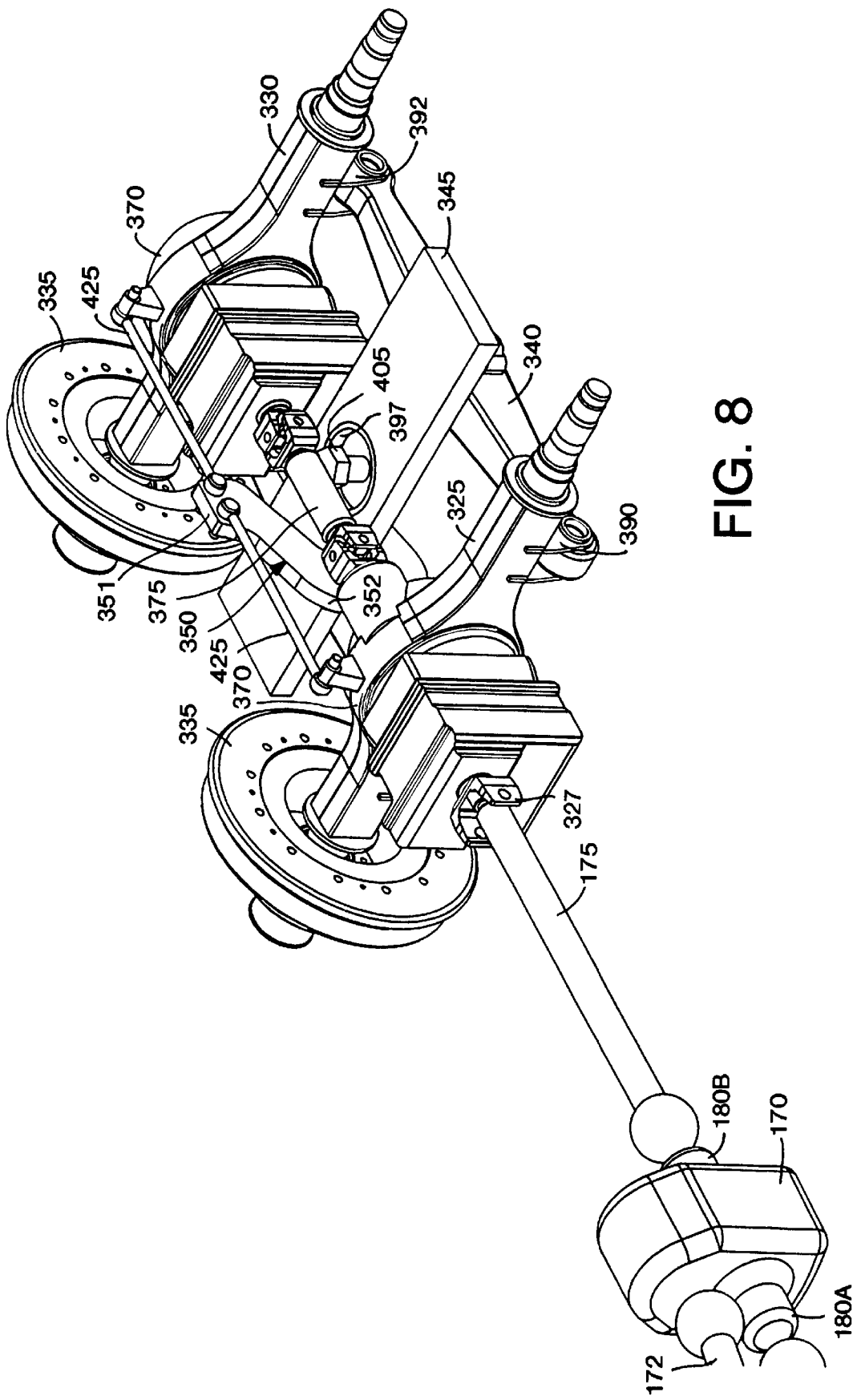

First axle 325 and second axle 330 are also structurally coupled together by a pair of walking beams 340. Walking beams 340 are adapted to be mounted between axles 325, 330 in mutually parallel-relation to one another, on the underside of the outer portions of axles 325,330 (FIGS. 7 and 8). Walking beams 340 are fastened to axles 325,330 by axle brackets 390 and 392, respectively. A pivot-hole 394 is centrally located on each walking beam 340, and is adapted to receive a pin or the like that couples each walking beam 340 to an outer end portion of lower pivot-plate 345.

Figure 9:
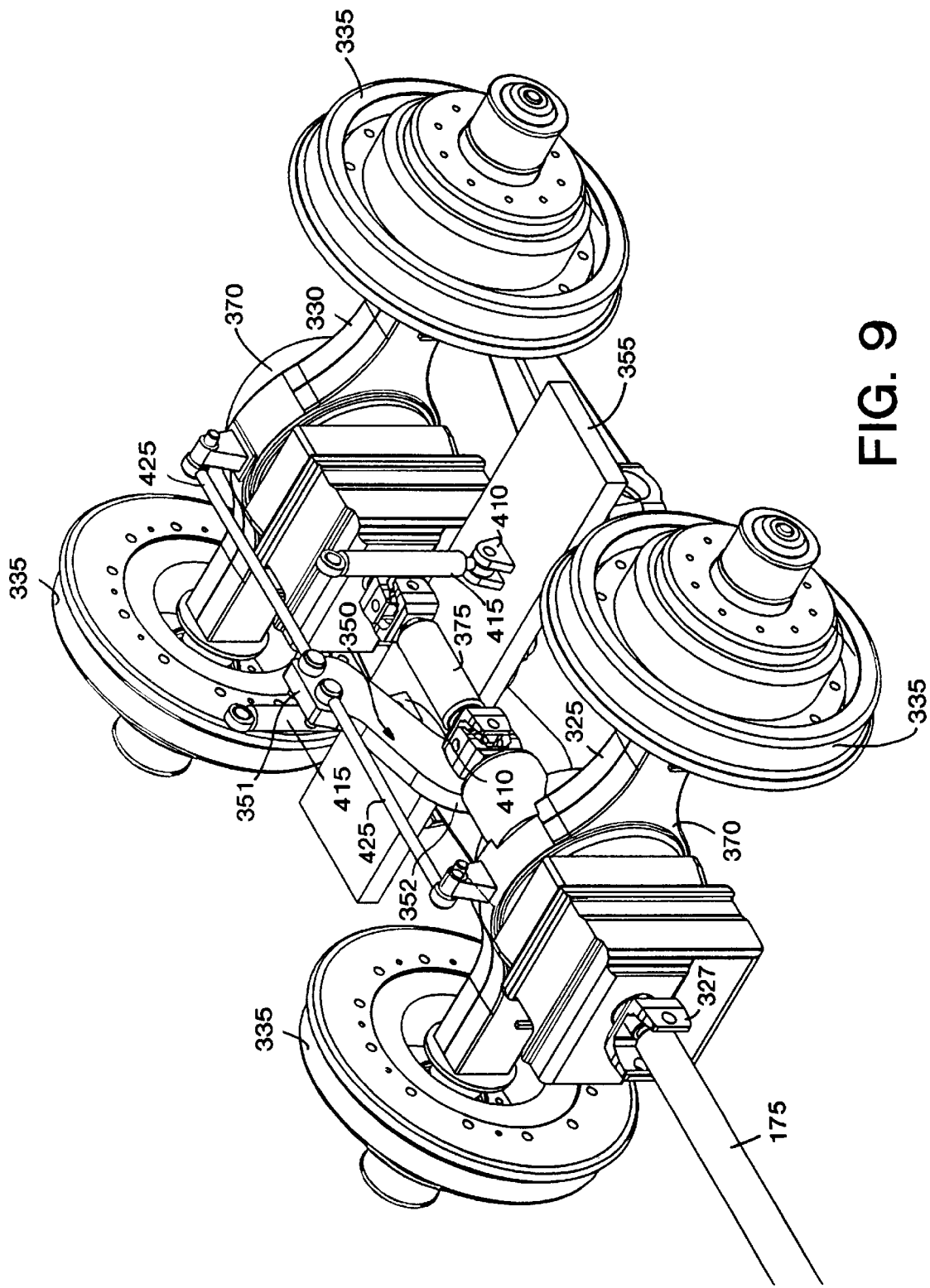

Referring to FIGS. 8 and 9, lower pivot-plate 345 comprises a substantially rectangularly shaped piece of structural material, such as steel or the like, having a centrally disposed recess 397 defined therein. Upper pivot-plate 355 comprises a similarly shaped piece of structural material that is mounted over top of lower pivot-plate 345. Upper pivot plate 355 comprises an annular ring disposed on its lower surface (not shown) that is sized and shaped so as to be slidingly received within recess 397 of lower pivot plate 345. The upper surface of upper pivot plate 355 comprises a pair of spaced-apart upper pivot-brackets 410. Each upper pivot-bracket 410 is adapted to be pivotally secured to a piston rod portion of a rail drive assembly lift cylinder 415. The free end of each cylinder housing of each rail drive assembly lift cylinder 415 is pivotally fastened to a lower portion of vehicle frame 110. Rail drive assembly lift cylinders 415 aid in the lifting of rail drive assembly 135 from engagement with rails 26 so as to switch from rail mode to road mode.

Advantageously, pivot plates 345 and 355 are secured to one another by pivot-bolt 405 so that lower pivot-plate 345 may be rotated clockwise or counterclockwise about pivot-bolt 405, i.e., about a substantially vertical axis of rotation, in a range from about 5 to 10 degrees relative to the longitudinal axis of vehicle 100. It will be understood from this construction that lower pivot-plate 345, walking beams 340 and axles 325,330 may be pivoted about pivot bolt 405 and relative to upper pivot-plate 355. Thus, the alignment of rail wheels 335 relative to rails 26 may be adjusted, prior to their engagement, so as to avoid improper engagement or misalignment of rail wheels 335 with rails 26. Additionally, pivoting of lower pivot-plate 355, and of rail wheels 335, about pivot-bolt 405 allows vehicle 100 to traverse curves along the railroad track in a manner approaching that of a conventional rail car.

Torque-reaction plate 350 comprises an upper portion 351 and a lower portion 352. Lower portion 352 is securely fastened to lower pivot-plate 345, adjacent to recess 397. Torque-reaction plate 350 projects upwardly in substantially perpendicular relation to lower pivot plate 345. A pair of torque-reaction bars 425 are fastened between upper portion 351 and an upper portion of each axle housing 370. In this way, when lower pivot-plate 345 is rotated relative to pivot-bolt 405, the torque from this rotation is evenly applied to both axles 325,330 so as to minimize any shearing forces and to facilitate the pivotal movement of axles 325,330 about bolt 405.

Figure 10:
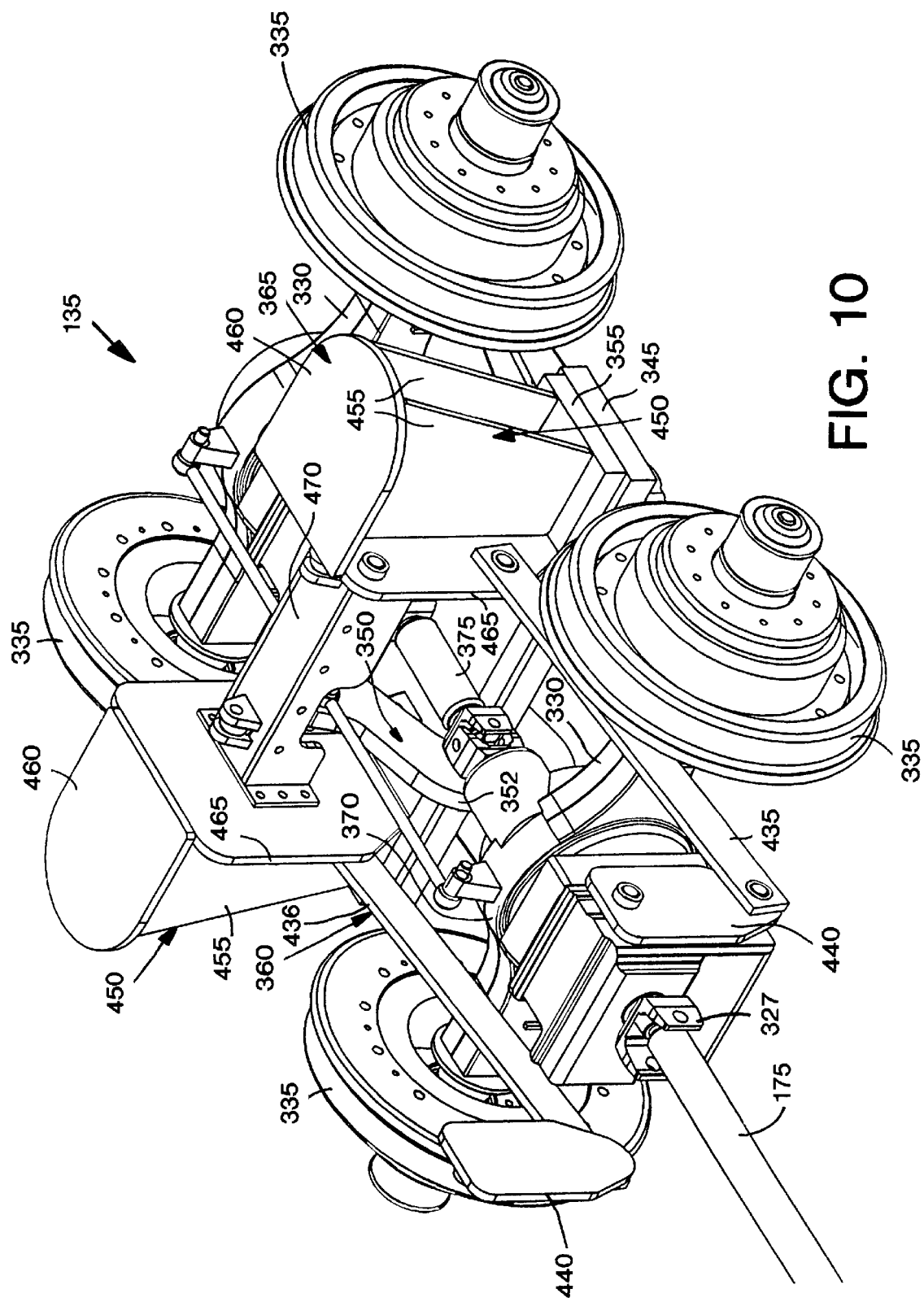

Referring to FIGS. 6 and 10, a four bar linkage assembly 360 is disposed on the left and the right sides of vehicle frame 110 and comprises a pair of link members 435,436 and a pair of frame mount plates 440. More particularly, link members 435,436 comprise elongate rods adapted to be pivotally mounted, at their ends, to portions of frame mount plates 440 and lift assembly support structure 365. Frame mount plates 440 are fastened to vehicle frame 110 on the right and left sides thereof adjacent to, but forward of rail drive assembly 135. A first end of each link member 435,436 is pivotally mounted to a portion of a frame mount plate 440 by means of a spherical sleeve bearing of the type that is well known in the art. A second end of each link member 435,436 is pivotally mounted to a portion of lift assembly support structure 365.

Lift assembly support structure 365 comprises a pair of support stands 450 comprising a pair of vertically oriented support members 455, an airbag-support plate 460, back plates 465, and a cross-brace 470. More particularly, support stands 450 are disposed on the right and left outer end surfaces of upper pivot-plate 355 so as to position the lower edge of vertically oriented support members 455 on the upper surface of lower pivot plate 355. In this way, airbag-support plate 460 is disposed in spaced-apart relation to lower pivot plate 355 and is structurally supported by vertically oriented support members 455.

Each back plate 465 is positioned between the inner edges of vertically oriented support members 455 and the outer edges of central trunk portion 287 of support member 285. An end of each of links 435,436 are pivotally fastened to a portion of a back plate 465 by spherical slip barrings of the type that are well known in the art. Cross-brace 470 is fastened to the inner surfaces of each back plate 465 so as to be transversely disposed between central trunk portions 287 of support members 285. Cross-brace 470 provides structural stability to rail drive assembly 135.

Referring once again to FIGS. 4 and 5, road rail vehicle 100 is operated in a similar fashion as road rail vehicle 10. More particularly, in the road mode the road wheels disposed on drive/steer axle 120 propel vehicle 100 independently of all of the rail wheels, i.e., unlike some prior designs, motive power directed to drive/steer axle 120 is not supplied via any of the rail wheels. This allows road rail vehicle 100 to travel at reasonable highway speeds and not to be limited to the low speeds associated with vehicles where road wheels are driven via rail wheels.

As with road rail vehicle 10, road rail vehicle 100 comprises a selector 46 of known type for controlling the application of motive power to either drive/steer axle 120 or rail drive assembly 135. Selector 46 may also incorporate controls for raising and lowering front rail guide assembly 130, flip-up tag axle 125, and rail drive assembly 135, as desired, to switch between road mode and rail mode.

More particularly, vehicles 100 may be switched from road mode to rail mode by first positioning vehicle 100 over top the railroad tracks with the front end of the vehicle pointed in the direction of travel. In this position, first and second front rail engagement wheels 137A and 137B and rail wheels 335 of rail drive assembly 135 are positioned in substantially parallel spaced-relation to rails 26, and flip-up tag axle 125 is in its lowered position (FIG. 4).

The switch to rail mode is then begun by manipulating selector 46 so as to initiate the application of air, air/spring, hydraulic, or other known lifting/lowering mechanisms to lower front rail guide assembly 130 into engagement with rails 26 (FIG. 5). Next, rail drive assembly 135 is lowered on to rails 26. More particularly, airbags 295 are inflated and rail drive assembly lift cylinders 415 are actuated so as to allow rail drive assembly 135 to be slowly lowered onto rails 26. It will be understood that rail drive assembly is guided in its downward travel by four bar linkage assembly 360.

Advantageously, axles 325,330 of rail drive assembly 135 may be rotated relative to vehicle frame 110, via rotation of lower pivot-plate 345, so as to allow for proper alignment of rail wheels 335 on rails 26.

Once rail drive assembly 135 has been lowered into engagement with rails 26, flip-up tag axle 125 may be lifted up out of contact with the road surface. More particularly, flip-up tag axle 125 is first unlocked from vehicle frame 110 by removing a locking pin from locking holes 242,247 of lever-bracket 210 and pivot-bracket 215. This releases flip-up tag axle 125 from locked engagement with vehicle frame 110.

Next, actuation cylinders 275 are energized so as to pull upon lever-arms 227 of lever-brackets 210. This causes frame 200 to pivot in a counterclockwise manner about the pivot pin disposed within frame-pivot hole 240 and pivot hole 245. Once rod 305 is substantially withdrawn within cylinder housing 310, flip-up tag axle 125 is fully disengaged with the road surface, as illustrated in FIG. 5.

Advantageously, use of rear wheel drive in the rail mode, via rail drive assembly 135, allows for better loading when shelf coupler 153 has a load of one or more freight or other rail cars coupled to it for pulling by vehicle 100. More particularly, shelf coupler 153 may be powered vertically, through the inflation of airbags 295, so as to engage a corresponding coupler on an adjacent rail car in order to transfer the load from the rail car to rail wheels 335 of rail drive assembly 135. This operation generates a resultant downward force on rails 26 by rail wheels 335, that allows for the application of sufficient tractive effort by rail wheels 335 on rails 26 for pulling/pushing heavy loads.

In order to return to the road mode, the foregoing procedure is simply reversed. More particularly, flip-up tag axle 125 is first pivoted clockwise about the pivot pin disposed within frame-pivot hole 240 and pivot hole 245 and then locked in place. Rail drive assembly 135 is then raised to the position shown in FIG. 4 by releasing the air from within airbags 295 and energizing lift cylinders 415.

Although specific constructions have been presented herein, it is to be understood that these are for illustrative purposes only. Various modifications and adaptations will be apparent to those of skill in the art. In view of possible modifications, it will be appreciated that the scope of the present invention should be determined by reference to the claims appended hereto.

What is claimed is:

1. A road and rail vehicle comprising:

a vehicle frame having a front end, a rear end, a right side, and a left side and means for propelling said vehicle along a track, said propelling means mounted on said frame;

a first axle having a right road wheel and a left road wheel operably mounted thereon in spaced-apart relation to one another, said first axle being mounted on said vehicle frame adjacent to said front end;

a second axle having a right road wheel and a left road wheel operably mounted thereon in spaced-apart relation to one another, said second axle being mounted on said vehicle frame rearwardly of said first axle;

a third axle having a right road wheel and a left road wheel operably mounted thereon in spaced-apart relation to one another, said third axle being mounted to and supported upon said rear end of said vehicle frame by at least one pivotal bracket so as to be selectively movable into and out of engagement with a road surface;

a rail guide assembly including at least a right rail wheel and at least a left rail wheel operably disposed in spaced-apart relation to one another on a rail axle and adjacent to said front end of said vehicle frame wherein said rail wheel guide assembly is selectively movable into and out of engagement with the rails of a railroad track; and a rail drive assembly including at least a right rail-drive wheel and at least a left rail-drive wheel operably mounted to an axle, wherein said axle is (i) operatively coupled to said propelling means, and (ii) movably mounted to said vehicle frame in confronting relation to said rail and between said second and said third axles, and further wherein said rail drive assembly include means for moving said axle relative to said frame so as to move said rail-drive wheels into and out of engagement with the rails of said railroad track.

2. The road and rail vehicle of claim 1 further comprising a mode controller operable to select between (i) a road mode in which said road wheels engage a road wherein said vehicle is propelled by driving said road wheels independent of said rail wheels, and (ii) a rail mode wherein said first rail wheel assembly and said rail-drive wheels engage the rails of said railroad track and further wherein said vehicle is propelled by driving said rail-drive wheels with all of said road wheels offset from engagement with any surface.

3. The road and rail vehicle of claim 2 comprising means for rotating at least a portion of said rail drive assembly about a vertical axis so as to provide for the adjustment of the orientation of said rail drive wheels relative to the rails of the railroad track when switching from said road mode to said rail mode.

4. The road and rail vehicle of claim 3 wherein said rail drive assembly comprises two axles operatively coupled together and each including a right and a left rail-drive wheel.

5. The road and rail vehicle of claim 2 further comprising a rail wheel unit movably supporting the right and left front rail engagement wheels for movement relative to the vehicle frame between an upper road position corresponding to said road mode and a lower rail position corresponding to said rail mode.

6. The road and rail vehicle of claim 2 wherein said means for propelling said vehicle comprise an engine supported by the vehicle frame and wherein said mode controller includes a transfer case and reversing transmission operable to selectively transfer power (i) from said engine to drive said right and left road wheels of said first axle when in said road mode; or (ii) from said engine to drive said right rail-drive wheel and said left rail-drive wheel of said rail drive assembly when in said rail mode.

7. The road and rail vehicle of claim 2 wherein said vehicle is driven by said first set of road wheels independent of said rail wheels when in said road mode.

8. The road and rail vehicle of claim 2 further comprising a first transmission adapted to transfer power from an engine to a transfer case and a second transmission adapted to selectively transfer power from said transfer case to said first axle when said vehicle is in said road mode and to said rail drive wheels when said vehicle is in said rail mode.

9. The road and rail vehicle of claim 2 comprising a shelf coupler disposed on said rear end of said vehicle and adapted to couple said vehicle to a corresponding coupler disposed on a rail car positioned on said railroad track wherein said shelf coupler comprises means for moving vertically relative to said corresponding coupler so as to engage said corresponding coupler and thereby transfer load from said rail car to said rail guide assembly so as to generate a resultant downward force on railroad track and thereby increase the tractive effort of said rail guide assembly for pulling/pushing heavy loads.

* * * * *